Figure 7:
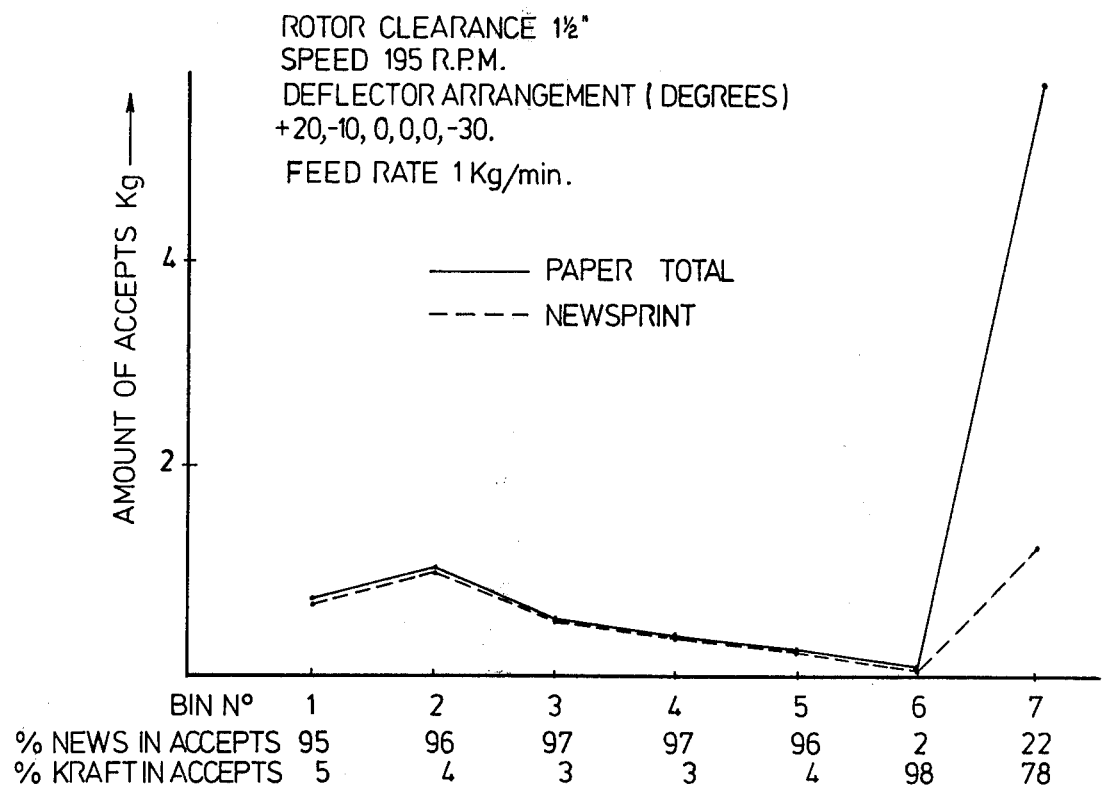
Figure 8:
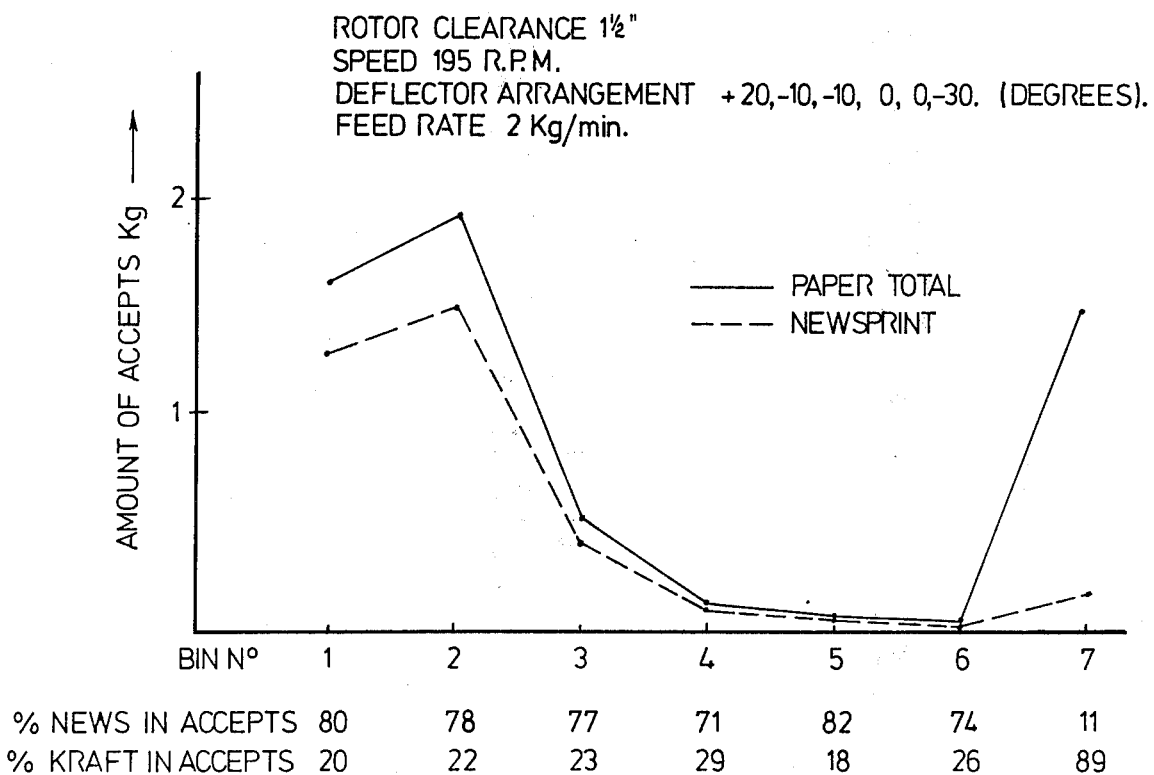
Figure 9:
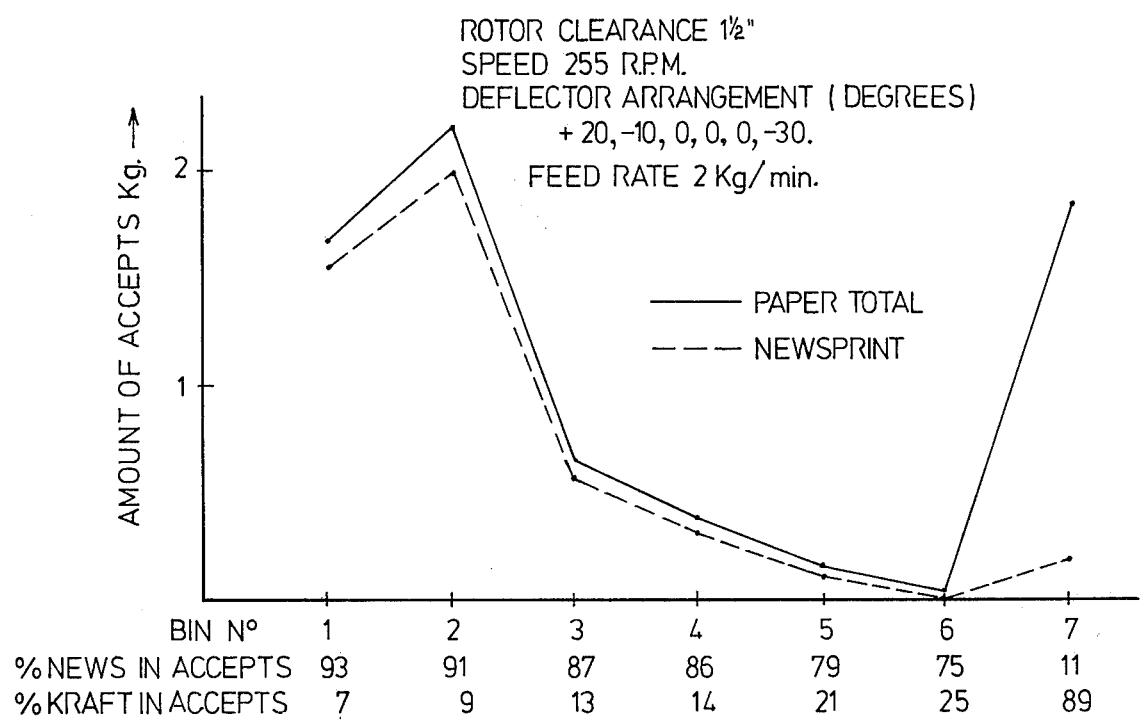
Figure 10:
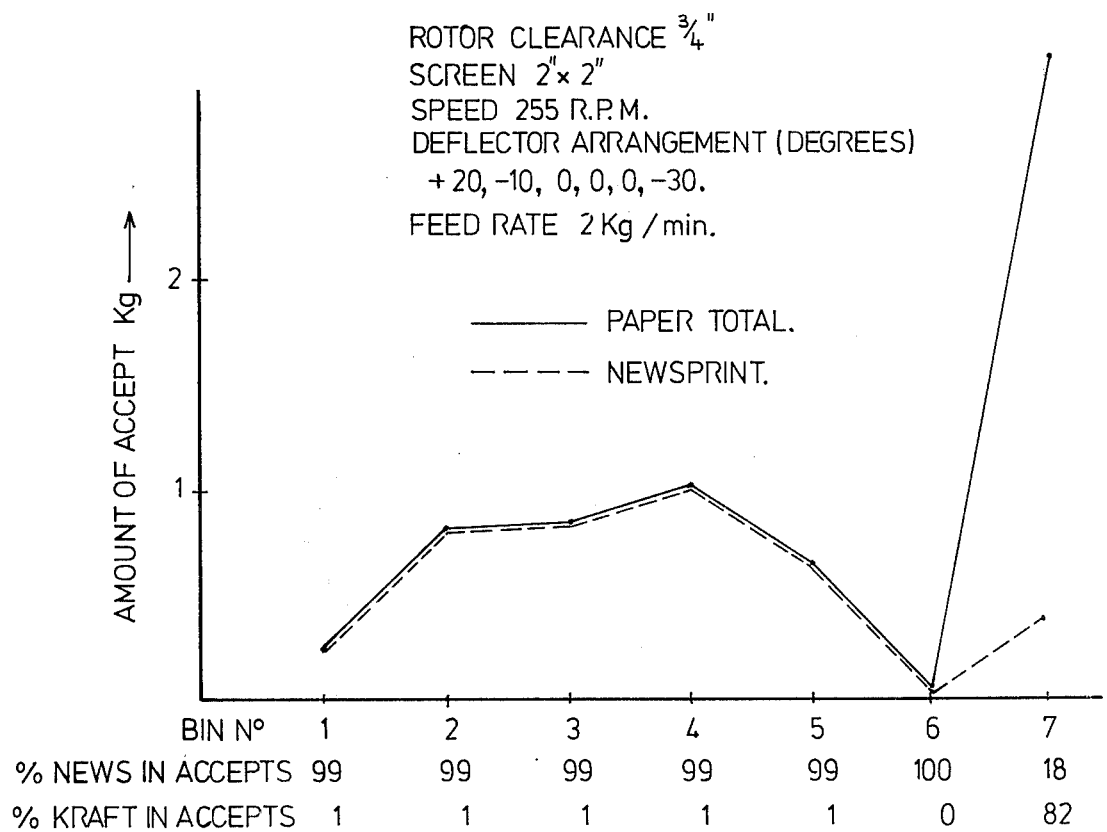
Figure 11:
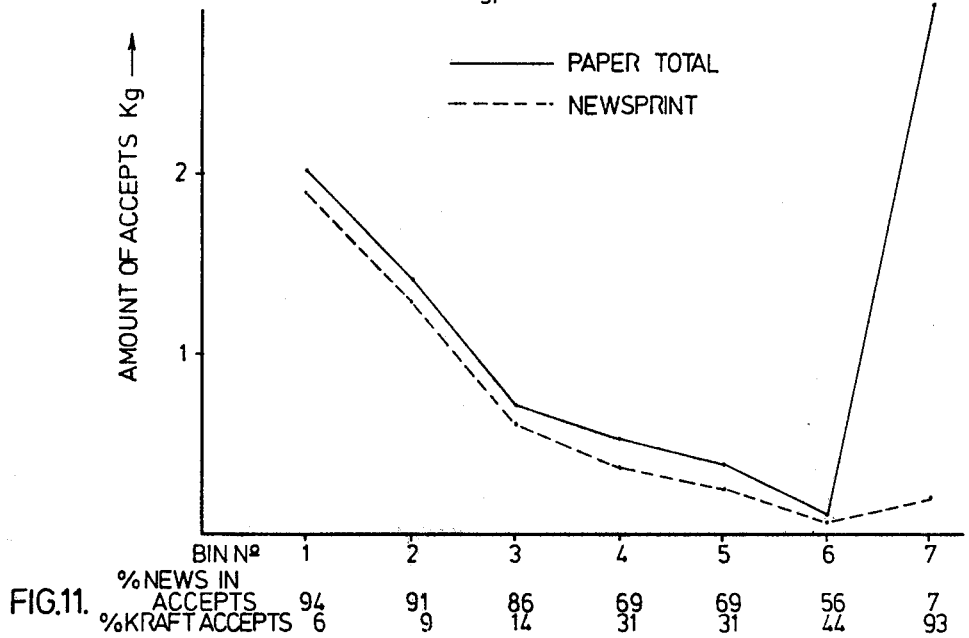
Figure 12:
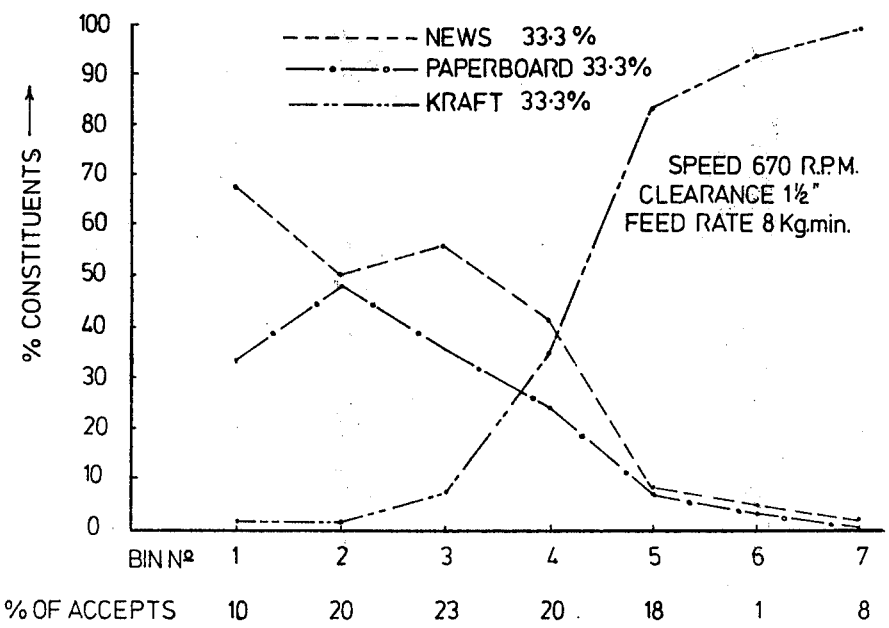
Figure 13:
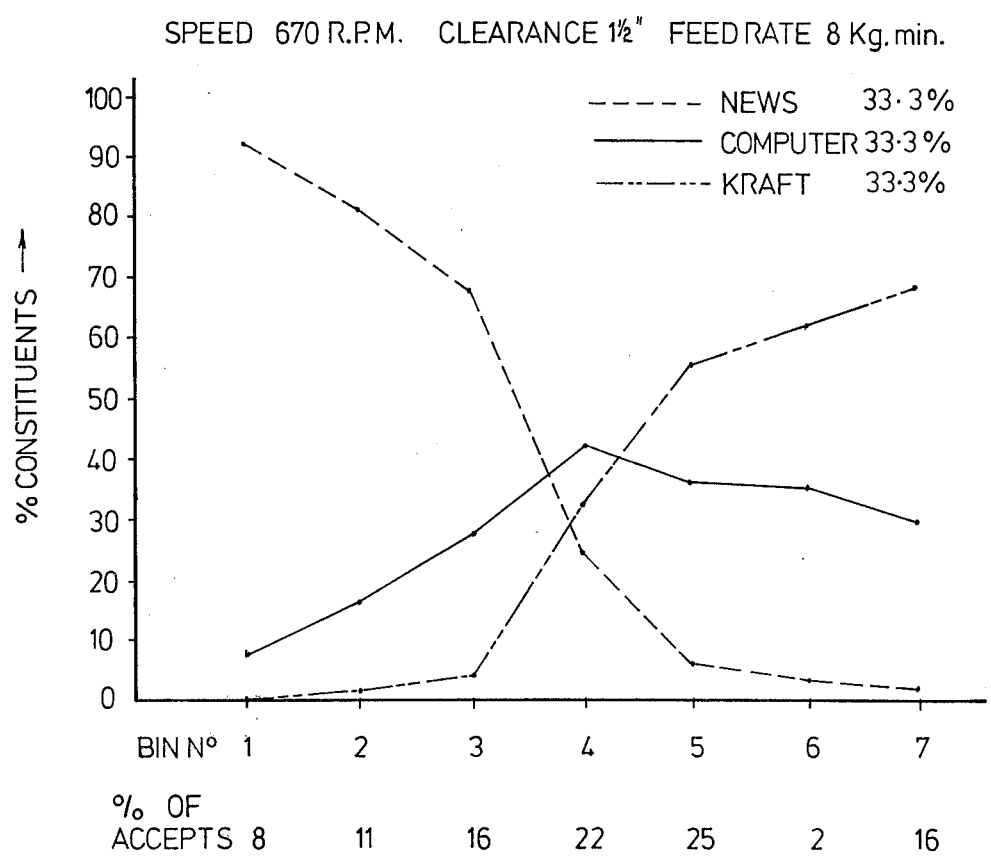

United States Patent [19]

Bialski et al.

[11] 4,124,168
[45] Nov. 7, 1978

[54] PAPER SORTING METHOD

[75] Inventors: Alexander Bialski, Loretteville; Camillo Gentile, Mississauga; Ola Sepall, Quebec, all of Canada

[73] Assignee: Reed Ltd., Toronto, Canada

[21] Appl. No.: 766,144

[22] Filed: Feb. 7, 1977

[51] Int. Cl.² .............................................. B02C 23/16
[52] U.S. Cl. ....................................... 241/14; 241/24; 241/28
[58] Field of Search ........................ 241/14, 24, 27, 28, 241/74, 84, 85, 86, 86.1, 87, 87.1, 88.1

[56] References Cited

U.S. PATENT DOCUMENTS

| 2,954,173 | 9/1960 | Dunwody | 241/86.1 |
| 3,834,630 | 9/1974 | Nelson | 241/152 A |
| 3,973,735 | 8/1976 | Ito et al. | 241/87 |

Primary Examiner—Granville Y. Custer, Jr.

[57] ABSTRACT

Disclosed are method and apparatus for applying forces to a waste paper mixture programmed to procure progressive fragmentation of the respective components of the mixture; the method including the step of harvesting the resulting paper fragments at intervals when fragmentation of one component is virtually completed and fragmentation of the next commences.

6 Claims, 13 Drawing Figures

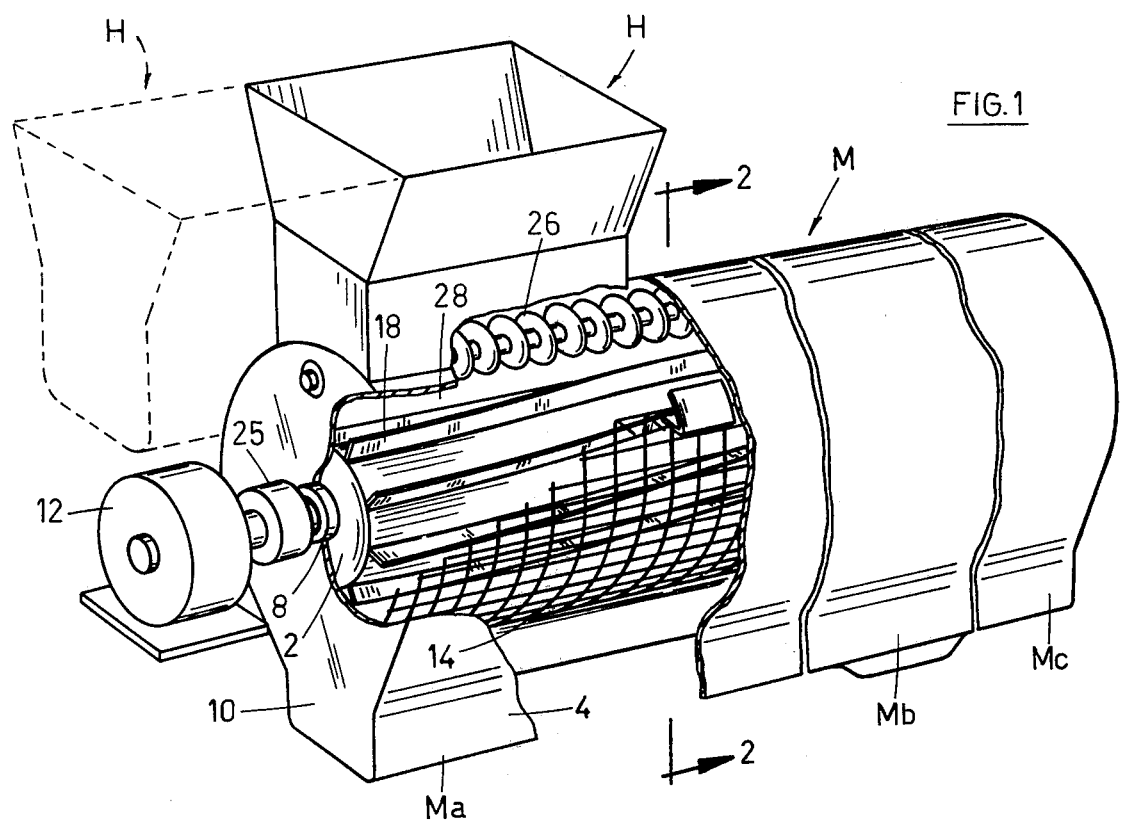
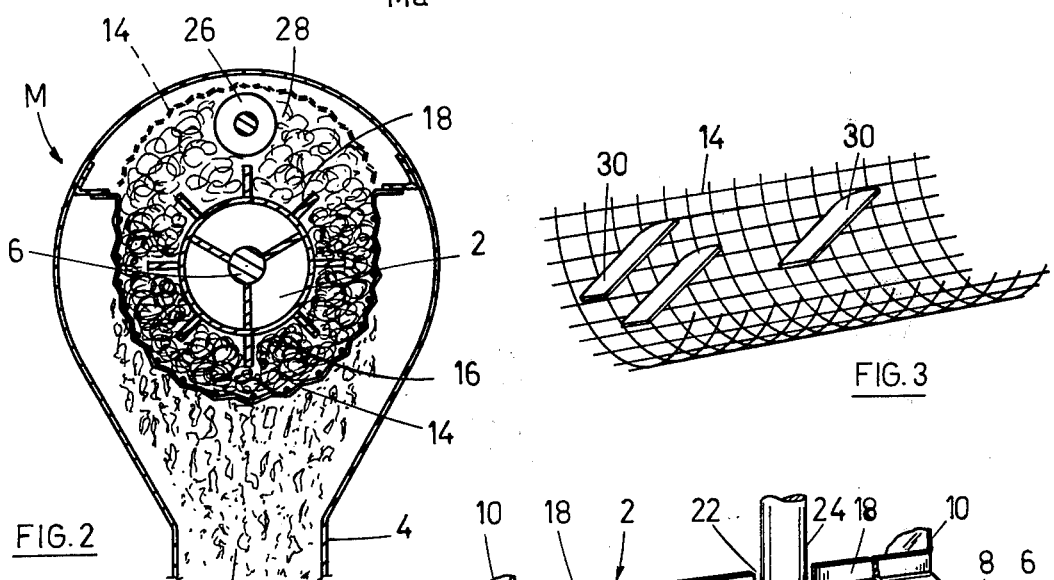
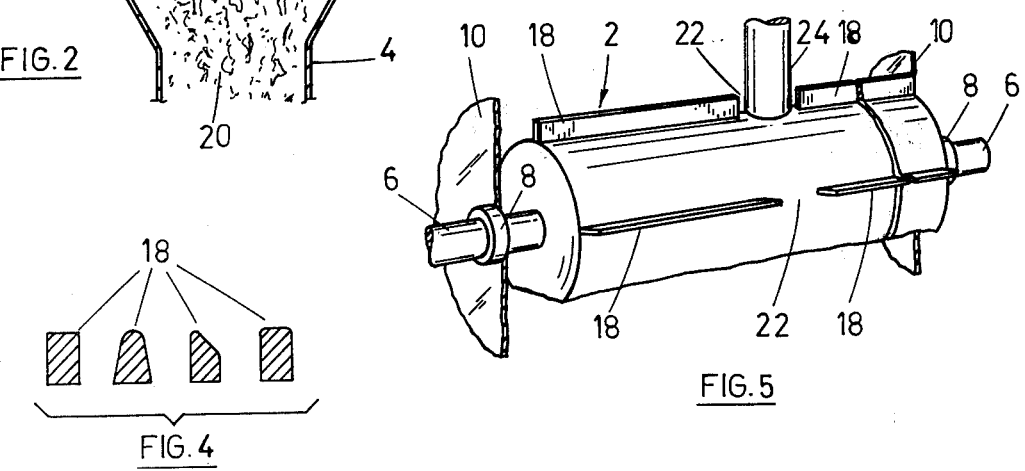

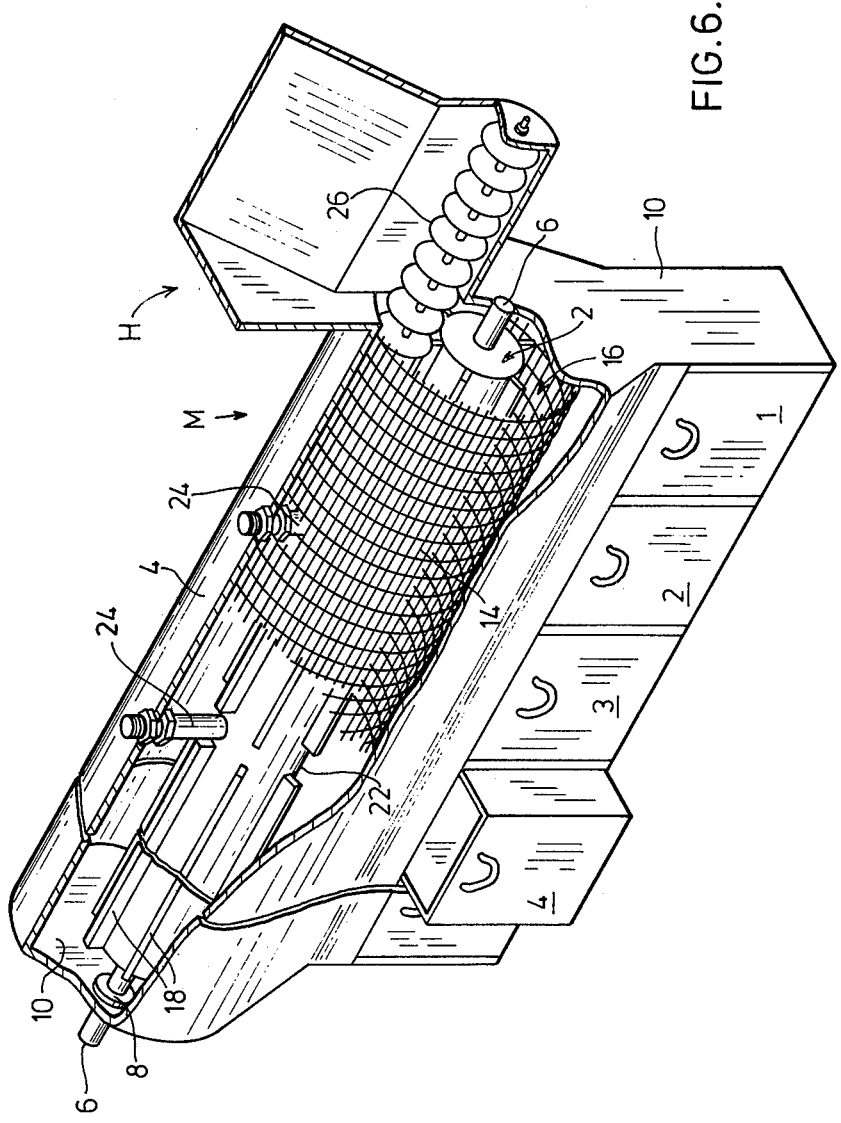

PAPER SORTING METHOD

The invention is broadly concerned with the recovery (in the sense of salvage) of waste paper as hereinafter described by method and means conducive to superior economic advantage over prior practices.

The salvage of waste paper concurrently appears to be increasing in commercial importance. That is to say, paper salvage objectives now seem to go beyond what might be termed "basic" salvage in which the recovered product was commercially acceptable only for inferior uses such as roofing felt, for example; the current trend being to try to upgrade the recovered product to permit, when and if possible, more economically advantageous uses thereof.

It will be appreciated that waste paper is often presented or available for salvage in mixtures which may contain components ranging from (superior) chemical kraft papers to (inferior) newsprint; all being intermingled together in random, heterogeneous, agglomeration. Accordingly, to upgrade the paper recovered from such mixtures and to improve the yield in a qualitative sense, it is preliminarily necessary to sort the mixtures into their respective components for processing separately from each other.

Waste paper mixtures as herein visualized are obtainable from a variety of sources; such sources being of no relevance to this invention so long as the paper provided thereby is dry with a moisture content not appreciably exceeding 60% and is capable of being milled in the manner hereinafter described.

One such source might be the waste paper which is scrapped daily in business offices and collected nightly by the office cleaning staffs. Obviously, such waste paper may well contain significant proportions of two or more components of various qualities ranging between fine quality stationery and low newsprint grades; the whole thoroughly and indiscriminately intermingled to form a mixture as herein contemplated. As an example only, office waste as above described may include an average of 60% of stationery of good quality; 20% of groundwood, newsprint or equivalent, 10% of Kraft paper and various others; it being understood that mixtures obtained from other sources may vary more or less not only in their components but also in their proportions.

It will be apparent that if a mixture of the foregoing proportions is recycled without preliminary sorting, the product recovered from the recycling operation will contain the same proportions of groundwood stationery and Kraft. When, however, newsprint (groundwood) predominates in the mixture, the resulting recycled product containing major proportion of inferior paper cannot be used for purposes requiring superior pulp.

A broad object of the invention is, therefore, to provide effective method and means for automatically sorting such paper mixtures to segregate their respective components for recycling separately from each other. It should be emphasized, however, that sorting according to the invention does not purport to procure uncompromising segregation of each paper grade from the other paper grades included in the mixture. Rather, what the invention seeks to do is to sort the various mixture components into separate concentrations which may or may not be admixed with greater or lesser quantities of other components.

The invention takes cognizance of and is predicated upon the fact that paper of one quality may be broadly distinguishable from another by the ease or difficulty with which they are respectively fragmented — i.e.: — broken up into fragments. Naturally, the resistance of a paper to fragmentation is not an infallible index to its quality; the strength and fragmentability of any particular paper being influenced by several factors in addition to its basic fibre such as its weight, for example.

Nevertheless, and as a practical matter, a generally effective and economical expedient for selectively sorting a paper mixture as described is to separate it into components according to their vulnerability to fragmentation herein broadly equated, for the purpose of the invention, with paper quality. For example, mechanical pulps or groundwood papers — such as newsprint — are generally more readily fragmentable than the chemical pulp variety such as Kraft, and, for present purposes, are accordingly deemed to be inferior to Kraft; it being acknowledged, nevertheless, that the comparative fragmentability of the two papers could vary considerably according to their respective specific characteristics to the extent that lightweight Kraft may, for example, fragment more readily than specially treated newsprint.

The invention seeks, as another of its objects, to provide such method and means for applying forces or stresses to paper to break it into fragments and, as a collateral object, to retrieve the resulting fragments; pre-sorted and separated according to fragmentability.

It is understandably necessary, of course, to expose all parts of a paper mixture to the method and means of the invention for the purpose of procuring maximum fragment yield in minimum time. In the present instance, however, the manipulation designed to procure such exposure serves additionally to apply fragmentation forces to the mixture; these being still further objects of the invention.

The invention achieves the foregoing and other objectives by the provision of method and means for applying fragmentation forces to a paper mixture as described; the mixture being churned throughout, not only to procure exposure of substantially all of its parts to the forces aforesaid but, as well, to contribute more or less to said forces; the churning and any other forces applied to the mixture being continued until at least one of said mixture components has been largely fragmented and eliminated from the mixture after which, of course, the described operation may be resumed or continued to fragment another or other components of the mixture.

The fragmenting operation described is carried out in a mill consisting, basically, of an enclosure and an impeller contained in the enclosure between which the paper is sandwiched and churned as described; the forces applied to the mixture being programmed as later described to procure progressive fragmentation of the various components of the mixture. Because of their qualitative differences however, certain of the paper components will fragment more readily than others and the invention visualizes that the fragment yield will be harvested at a suitable stage or at suitable stages during the milling operation substantially between the times when fragmentation of one quality of paper is largely completed and before fragmentation of another has begun although strict precision in this respect is not critically important to the invention and is probably difficult to attain.

A selected embodiment of the invention exemplary of its elements, parts and principles will now be described with reference to the accompanying drawings wherein:

FIG. 1 — is a schematic view of a mill in isometric form with parts thereof broken away to reveal structural details on the interior thereof and with other break lines along its length; a projected addition being shown in dotted lines;

FIG. 2 — is a section along the line 2—2 of FIG. 1 with paper added thereto to indicate the function of the mill;

FIG. 3 — is an isometric view of a detail of the invention;

FIG. 4 — contains a series of cross sectional profiles of another part of the invention, and FIG. 5 — is a schematic view in isometric and broken form of a part of the invention with parts of the mill housing.

FIG. 6 — a schematic view of a mill in isometric form with parts thereof cut-away to reveal interior details and incorporating the addition indicated by dotted lines in FIG. 1.

The apparatus illustrated in the drawing is intended to summarize the means contemplated by the invention while the following explanations of its use and function is believed and intended to typify the specific methods visualized.

As has been indicated, the invention achieves its objectives by applying forces to a paper mixture which will reduce its various components to fragments. Inasmuch as the respective components vary in their vulnerability to the fragmentation forces, one or another of such components may, in the normal course of events be almost completely fragmented before fragmentation of others of the components commences; the resulting fragments being harvested at this juncture.

In the broad concept of the invention, the operative forces are programmed so that, ideally, each individual paper component is relatively completely fragmented in its turn with fragments of each being harvested, also in turn. In actuality, however, some overlap between the fragmentation (and harvesting) of "neighbouring" components is believed to be inevitable. Subsequent reference herein to "complete" fragmentation and "complete" harvesting will therefore be understood to contemplate such overlap.

The milling operation providing the forces by which the components of the paper mixture are respectively fragmented may be carried out in a mill M wherein all components of the mixture are contemporaneously and indiscriminately exposed to such forces; procuring progressive fragmentation of respective ones of such components; the paper mixture being, preferably, churned during such milling operations to procure and ensure exposure of all of its parts and portions to the fragmentation forces which are themselves augmented, or supplemented, more or less, by the churning.

It should be explained and understood that the term "churning" as utilized herein is meant to imply and include all manipulation involved in the turning or tumbling of the paper mixture to procure exposure of all of its parts to the fragmentation forces. In turning it over, as will be appreciated, the paper mixture is subjected to a wide range of mechanical manipulations e.g. bending, twisting, flexing, kneading, massaging, friction, pulling, tearing, crumpling and probably others as well which, it is thought, serve or co-operate to procure disruption and ultimate fragmentation of the component papers within the paper mixture.

One manipulation which the invention seeks to avoid, however, is the chopping or cutting of the paper which would threaten the necessary selectivity of the invention as between the various components and would, in addition, shorten the paper fibres thereby degrading the paper harvest.

The mill M selected for the exemplary purposes of this submission and shown schematically in FIG. 1 includes an impeller 2 mounted for rotation in mill housing 4 on shaft 6 journalled as at 8—8 (FIGS. 1 and 5) in the ends 10—10 of the housing 4; the reference numeral 12 denoting a motor which may be coupled in a known manner to shaft 6 for rotating the impeller 2 at a desired speed.

In this instance said impeller 2 is either partially or completely enclosed by heavy wire screening 14 with a mesh dimensioned to accommodate sifting of the paper fragments therethrough. Preferably, the mesh should be between the limits of $\frac{1}{2}$ inch and 4 inches; a mesh of 2 inches having proven very effective in experimental runs as will appear.

The screening 14 is spaced from the impeller 2 leaving space 16 within the enclosure for the accommodation of paper mixture and fins 18 extending radially from impeller 2 and spaced about its circumference serve as scoops for engaging and moving the paper mixture in space 16 when impeller 2 is rotated whereby the paper is not only churned as above described but is also scrubbed against screening 14 to procure or aid in procuring its fragmentation.

It will be apparent that several factors come into play and have a bearing of more or less importance on the speed and efficiency of paper fragmentation in or by the mill M.

Among more obvious of such factors is the rotary speed of impeller 2 as well as the length of time that the paper is exposed to the fragmentation forces in mill M; examples of the impeller speed and residence time being provided later on herein.

Of additional and collateral significance is the width of space 16 around impeller 2; the amount of paper crammed into the space; the moisture content of such paper; the cross-sectional shape of fins 18; the extent of their projection into space 16; the quality of the paper, and other like factors of more or less consequence to which further reference may be made herein.

The appropriate balancing of these and other factors to procure an optimal result in any given instance, herein defined as a program, ensures the most effective and economical function of mill M as will appear.

It may now be explained that screening 14 provides not only an effective solution to the requirement for an impeller enclosure but also provides numerous openings through which paper fragments 20 produced by said forces may be eliminated and harvested. Obviously screening 14 is one of the many kinds of foramenous media which may serve to enclose impeller 2 and afford elimination facilities for fragments 20.

For an understanding of the function and performance of mill 4, it may be assumed, for example, that a given paper mixture has three components differing from each other in their respective vulnerability to fragmentation under the forces developed in mill M which have been suitably programmed for the purposes of the invention. For the purposes of this example, said three components may consist of groundwood newsprint; heavy Kraft wrapping paper and fine stationery.

When and as this paper mixture is subjected to the milling operation the first of its three components (which is ordinarily most vulnerable to the fragmentation forces) will begin first to break up with its resulting fragments 20 being eliminated through screening 14 as in FIG. 2. At a given point or stage in the milling operation, measurable in time, for example, the first paper component may be assumed to have been, relatively, completely fragmented and harvested. Only insofar as it is practicable, however, the programming should be aimed at confining the fragmentation to one grade of paper at a time to minimize adulteration of the harvest by stray fragments of other grades. At all events, continued milling will then procure fragmentation of the second component and when that is completed and the resultant fragments harvested the paper remaining in the mill will, obviously, constitute the last component of the mixture. In practice, of course, and it will be understood that, one or more additional components may be included in the mixture between the second and last.

It may be, of course, that the second or any subsequent component will require a different arrangement of the forces for its fragmentation. In such eventuality, of course, two obvious alternatives would be available, namely, (a) either to re-arrange the forces to act on said second or subsequent component in the same mill M for example, by varying the impeller speed or any of the other variables or (b) to move the unfragmented paper from mill Ma where the first component was treated, to a second mill Mb, arranged more appropriately to that component.

These alternatives are represented in FIG. 1 of the drawing wherein mill M appears as an elongated machine and wherein fins 18 are affixed to impeller 2 in a spiral inclination whereby rotation of impeller 2 will not only churn the paper mixture trapped between impeller 2 and screening 14 but will also advance it from the input end of mill M at the left of this view to the other end.

As shown in this FIG. 1 said mill M is divided into three units Ma, Mb, and Mc by two pairs of broken lines to imply discontinuity indicating that the units Ma, Mb, and Mc or any neighbouring two may be separated or merged into one. In practice it will be obvious that the respective units need not be disposed adjacent or beside each other when they are separate.

Fins 18 may be spiroid as shown in FIG. 1 or may, of course, be rectilinear as shown in FIG. 5. Likewise they may be continuous throughout the length of the impeller 2 or may be interrupted, leaving gaps 22, and studs 24, suitably affixed to other parts of mill M such as mill housing 4 as illustrated for example in FIG. 6, may be positioned to pass through gaps 22 when the impeller 2 is rotated; coincidentally pulling paper through gaps 22.

Cross-sectionally, the fins 18 may have a variety of shapes such as those shown in FIG. 4; care being taken to shape the fins to avoid cutting the paper.

It will now be apparent that there are numerous ways in which mill M may be constituted according to the invention to render it most effective for the fragmentation of the paper it may be called upon to handle.

Reference has already been made to the fin structure. In addition, the force with which paper is rubbed along screen 14, may also be affected by varying the rotary speed of impeller 2 which may be achieved in any of many known ways or by means of known controls suggested for example by the block element 25 in FIG. 1.

Paper mixture may be fed from hopper H to mill M with or without the assistance of an auger feeder 26, for example, which if used, agitates the mixture in hopper H and induces it to drop into a plenum 28 above impeller 2 with which it has necessarily unobstructed communication; the rate of feed being another in the factors governing the efficient operation of mill M since it has a bearing on the quantity of paper crammed into space 16.

A still further factor of major importance is the time during which the paper remains in the mill M.

Obviously, the importance of any single factor is dependent upon others.

The time factor, for example, may be lessened or increased by varying the impeller speed or the rate of feed. The rate at which paper is fed into mill M is also variable with appropriate compensation in other factors.

It is the balance of these factors, however, according to the specific papers to be fragmented and the moisture content thereof which is herein compendiously referred to as a program. Ideally, the practice of the invention is intended to be confined to "dry" paper having a moisture content not substantially exceeding 60%.

In the use of the present invention, paper mixture to be sorted thereby is fed into hopper H (FIG. 1) from which it is transferred with the aid of auger feeder 26 into plenum 28 where it is captured by fins 18 on the rotating impeller 2 and brought down into space 16 where it is subjected not only to vigorous churning but also scrubbed against screening 14 resulting in its fragmentation and elimination of its fragments through screening 14 whose mesh is appropriately dimensioned to permit sifting of the fragments therethrough.

Obviously, the component of the mixture most prone to fragmentation will be the first to be eliminated as aforesaid; other components being thereafter fragmented and eliminated, in the same manner, in turn, as the milling of the residue is continued either with the same or alternative programming.

The described construction of mill M has been confined to basics inasmuch as there may well be many structural forms in which the inventive concept is capable of successful embodiment.

For example, it will be appreciated that the invention achieves its objectives by churning relatively dry paper between an impeller 2 and an enclosure such as screening 14 with a mesh large enough, say, up to 4 inches to accomodate sifting of resultant fragments 20 therethrough but not smaller than ½ inch to avoid retaining them in the enclosure for further dimensional reduction. In this embodiment, the churning is accomplished in the traditional and obvious manner by rotating the impeller 2 inside stationary screening 14. In appropriate circumstances, however, recourse may be had to the obvious alternatives of rocking or rotating the screening 14 instead of or in addition to the impeller 2 especially if it (screening 14) is continued all around impeller 2 to enclose plenum 28 as well as space 16 as suggested by the broken lines in FIG. 2; it being understood that the continued screening will avoid obstructing communication between hopper H and plenum 28.

Fins 18 are the elements of choice which enable the impeller 2 to capture paper in the plenum 28 and transport it to space 16 as well as to aid in the churning of the paper and in scrubbing it against screening 14. However, there is wide latitude on the cross-sectional profiles of fins 18 as will be obvious from FIG. 4 and there is also some latitude in their general form as, for example, the discontinuous form shown in FIG. 5 and the sinuous or spiroid form shown in FIG. 1 which tends to propel paper mixture within the enclosing screen lengthwise of the impeller 2 while the latter is rotating.

It will be understood and appreciated incidentally, that the introduction of paper into plenum 28 on the one hand and its advancement through the mill M may be effected in various ways of which the auger feeder 26 and the spiroid fins 18 of FIG. 1 are merely representative.

Thus, in FIG. 1 hopper H is shown repositioned (in dotted lines) at the left of this view; it being understood that, in that event, the auger 26 need be only long enough to move paper from the re-positioned hopper H into plenum 28, as shown, for example, in FIG. 6.

The advance of the paper from left to right of mill M as pictured may be effected or aided by slanted deflectors 30 attached to screening 14 more or less as shown in FIG. 3 or in fact the paper may be advanced in any other of the many ways known.

It is within these parameters that the invention is constituted and of course, the specific media by which the invention is practiced are factors bearing generally on the programming of the final equipment.

Some examples of the results achieved by varying the variable elements in the present mill are presented below.

In one series of trials, resort was had to a paper mixture comprised 50% of newsprint stock and 50% of Kraft stock. This mixture was fed at the rate of 1 kg per minute into an experimental mill according to the invention in which the screening had a mesh of 2 × 2 inches and in which there was a clearance of 1½ inches between the impeller and the screening.

Seven separate bins, numbering 1 to 7, were arranged in succession, starting from the input end of the mill M and below the screening to receive paper fragments filtering therethrough as the mixture advanced through the mill from the hopper end to the opposite end.

With an impeller speed of 195 RPM, the fragment recovery from the several bins was as follows:

| BINS  | 1  | 2  | 3  | 4  | 5  | 6  | 7  |
|-------|----|----|----|----|----|----|----|
| NEWS  | 95 | 96 | 97 | 97 | 96 | 2  | 22 |
| KRAFT | 5  | 4  | 3  | 3  | 4  | 98 | 78 |

When the feed rate was doubled to 2 kg per minute the following recoveries resulted:

| BINS  | 1  | 2  | 3  | 4  | 5  | 6  | 7  |
|-------|----|----|----|----|----|----|----|
| NEWS  | 80 | 78 | 77 | 71 | 82 | 74 | 11 |
| KRAFT | 20 | 22 | 23 | 29 | 18 | 26 | 79 |

Raising the impeller speed to 255 RPM brought the following results:

| BINS  | 1  | 2  | 3  | 4  | 5  | 6  | 7  |
|-------|----|----|----|----|----|----|----|
| NEWS  | 93 | 91 | 87 | 86 | 79 | 75 | 11 |
| KRAFT | 7  | 9  | 13 | 14 | 21 | 25 | 89 |

Maintaining the impeller at a speed of 255 RPM but halving the clearance between it and the screening to ¾ inch had the following effect:

| BINS  | 1  | 2  | 3  | 4  | 5  | 6   | 7  |
|-------|----|----|----|----|----|-----|----|
| NEWS  | 99 | 99 | 99 | 99 | 99 | 100 | 18 |
| KRAFT | 1  | 1  | 1  | 1  | 1  | 0   | 82 |

Finally, increasing the impeller speed to 375 RPM and restoring the clearance between the impeller and the screening to 1½ inches yielded the following:

| BINS  | 1  | 2  | 3  | 4  | 5  | 6  | 7  |
|-------|----|----|----|----|----|----|----|
| NEWS  | 94 | 91 | 86 | 69 | 69 | 56 | 7  |
| KRAFT | 6  | 9  | 14 | 31 | 31 | 44 | 93 |

Obviously, the residence time in each instance varied correspondingly to the rate of feed; the impeller speed; the positioning of the deflectors, and so forth. At no time, however, did the residence time fall below 40 seconds or exceed 210 seconds.

It will thus be apparent that mill sections Mb and Mc hereinbefore referred to may be, merely, axial continuations of the unit Ma shown in the drawing with the impeller 2 and screening 14 of unit Ma being merely extended into units Mb and Mc with variations in the clearance between the impeller and screening; in the profiles of fins 18, or by the angulation of the deflectors 30 appropriate to the diminished flow of paper mixture through these units.

Alternately, of course, units Ma, Mb and Mc may be constituted by separate mills; each appropriately programmed. In that event, partially fragmented paper mixture may be physically transferred from one mill unit to the other.

It will be recalled that the paper mixtures processed by the invention may be derived from a variety of sources in which situation it will be understood that they may contain substances other than paper and it will be, therefore, further understood that such substances which are incapable of fragmentation may be recovered from the enclosure after fragmentation of the other constituents of the mixture.

The true scope of the invention is therefore as set forth in the appended claims which now follow.

We claim:

1. Method of operating on a dry paper mixture to separate and retrieve at least one of its components from the remainder of the mixture comprising the steps of:
   contemporaneously subjecting all components of the mixture to a milling operation;
   applying forces to said mixture including scrubbing it against a surface to procure progressive fragmentation of respective ones of said components, and
   retrieving the paper fragments resultantly produced at one stage, at least, of said milling operation.

2. Method as set forth in claim 1 wherein the milling operation includes churning of the mixture to expose all portions thereof to the milling forces and, as well, to generate and apply some, at least, of said forces.

3. Method as set forth in claim 2 wherein the churning of the mixture is carried out in an enclosure.

4. Method as set forth in claim 2 wherein the churning of the mixture is carried out in an enclosed space having numerous openings through which said fragments are retrievable; said forces serving to fragment substantially all of said one component and to reduce it to fragments capable of passing through said openings and said fragments being retrieved before fragmentation of the remainder of said mixture.

5. Method as set forth in claim 4 wherein the churning of the paper is carried out between an impeller and an enclosure means providing said openings; at least one of them being rotated to effect said churning.

6. Method as set forth in claim 5 wherein the impeller is rotated.

* * * * *